(12) United States Patent
Yasuyama et al.

(10) Patent No.: US 10,035,324 B2
(45) Date of Patent: Jul. 31, 2018

(54) FORMED MEMBER AND MANUFACTURING METHOD THEREOF

(75) Inventors: Masanori Yasuyama, Kobe (JP);
Yoshiaki Nakazawa, Takaazuka (JP);
Masahito Tasaka, Kisarazu (JP);
Toshiya Suzuki, Amagasaki (JP);
Masahiro Nakata, Takatsuki (JP);
Hiroki Fujimoto, Amagasaki (JP);
Hitomi Nishibata, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 599 days.

(21) Appl. No.: 13/823,901

(22) PCT Filed: Sep. 16, 2011

(86) PCT No.: PCT/JP2011/071209
§ 371 (c)(1),
(2), (4) Date: May 28, 2013

(87) PCT Pub. No.: WO2012/036262
PCT Pub. Date: Mar. 22, 2012

(65) Prior Publication Data
US 2014/0147693 A1 May 29, 2014

(30) Foreign Application Priority Data
Sep. 16, 2010 (JP) .................. 2010-208178

(51) Int. Cl.
*B32B 3/28* (2006.01)
*B32B 15/01* (2006.01)
(Continued)

(52) U.S. Cl.
CPC .................. *B32B 3/28* (2013.01); *B21D 5/08* (2013.01); *B21D 21/00* (2013.01); *B21D 22/00* (2013.01);
(Continued)

(58) Field of Classification Search
CPC .. B32B 3/28; B32B 15/01; B32B 3/00; B32B 3/02; B32B 3/04; B32B 3/08;
(Continued)

(56) References Cited

U.S. PATENT DOCUMENTS 3,816,697 A 6/1974 Derdowski et al.
6,509,541 B2 1/2003 Jung et al.

FOREIGN PATENT DOCUMENTS

CN 1953839 4/2007
EP 1195208 4/2002
(Continued)

OTHER PUBLICATIONS

Machine Translation, Kikuchi et al., JP 2007-314817, Dec. 2007.*
Machine Translation, Uchihara et al., JP 2000-197969, Jul. 2000.*
Machine Translation, Fukahori et al., JP 07-032176, Feb. 1995.*

*Primary Examiner* — Michael E. La Villa
(74) *Attorney, Agent, or Firm* — Clark & Brody

(57) ABSTRACT

A formed member is provided which can be manufactured at a low cost, which has excellent dimensional accuracy, which has excellent axial crushing properties and three-point bending properties, which has excellent bending stiffness and torsional stiffness, and which is suitable for use in a component of an automobile. The formed member (20) has a reinforcing member (35) which is joined by a weld (40) provided on a ridge portion (28). It is manufactured by joining a flat sheet blank and a flat sheet reinforcing member (35) by a weld (40) and performing bending so that the weld (40) becomes a ridge portion (28).

7 Claims, 17 Drawing Sheets

(51) Int. Cl.
    *B21D 21/00*      (2006.01)
    *B32B 3/00*      (2006.01)
    *B32B 3/08*      (2006.01)
    *B32B 3/04*      (2006.01)
    *B32B 3/02*      (2006.01)
    *B21D 35/00*      (2006.01)
    *B62D 25/04*      (2006.01)
    *B62D 21/15*      (2006.01)
    *B23K 31/02*      (2006.01)
    *B21D 5/08*      (2006.01)
    *B21D 22/00*      (2006.01)
    *B21D 22/20*      (2006.01)
    *B23K 101/00*      (2006.01)
    *B60R 19/03*      (2006.01)
    *B21D 49/00*      (2006.01)
    *B21D 53/88*      (2006.01)

(52) U.S. Cl.
    CPC .......... *B21D 35/007* (2013.01); *B23K 31/022* (2013.01); *B32B 3/00* (2013.01); *B32B 3/02* (2013.01); *B32B 3/04* (2013.01); *B32B 3/08* (2013.01); *B32B 3/085* (2013.01); *B32B 15/01* (2013.01); *B62D 21/157* (2013.01); *B62D 25/04* (2013.01); *B21D 22/208* (2013.01); *B21D 49/00* (2013.01); *B21D 53/88* (2013.01); *B23K 2201/006* (2013.01); *B60R 19/03* (2013.01); *Y10T 29/49826* (2015.01); *Y10T 428/1241* (2015.01); *Y10T 428/12347* (2015.01); *Y10T 428/12354* (2015.01); *Y10T 428/12375* (2015.01); *Y10T 428/12382* (2015.01); *Y10T 428/12958* (2015.01)

(58) Field of Classification Search
    CPC ............... B32B 3/085; Y10T 428/1241; Y10T 428/12347; Y10T 428/12354; Y10T 428/12375; Y10T 428/12382; Y10T 428/12958
    See application file for complete search history.

(56) References Cited

FOREIGN PATENT DOCUMENTS

| | | |
|---|---|---|
| EP | 1595611 | 11/2005 |
| JP | 04-072010 | 3/1992 |
| JP | 7-32176 | 2/1995 |
| JP | 10-017933 | 1/1998 |
| JP | 11-152541 | 6/1999 |
| JP | 2000-197969 | 7/2000 |
| JP | 2001-310223 | 11/2001 |
| JP | 2004-058141 | 2/2004 |
| JP | 2004-276031 | 10/2004 |
| JP | 2004-338419 | 12/2004 |
| JP | 2005-095934 | 4/2005 |
| JP | 2007-154257 | 6/2007 |
| JP | 2007-314817 | 12/2007 |
| JP | 2008-155749 | 7/2008 |
| JP | 2008-200713 | 9/2008 |
| JP | 2010-90463 | 4/2010 |
| JP | 2010-143333 | 7/2010 |
| JP | 2011-088484 | 5/2011 |

\* cited by examiner

Fig. 10
(a)
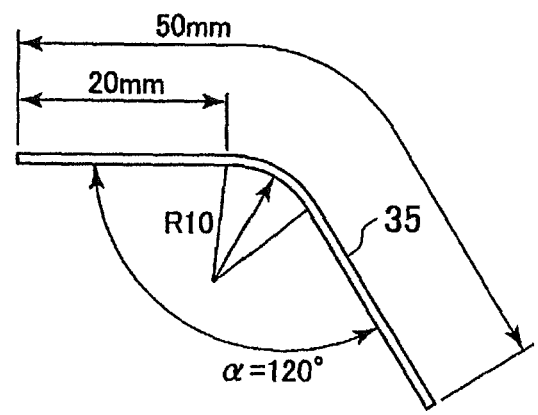
(b)
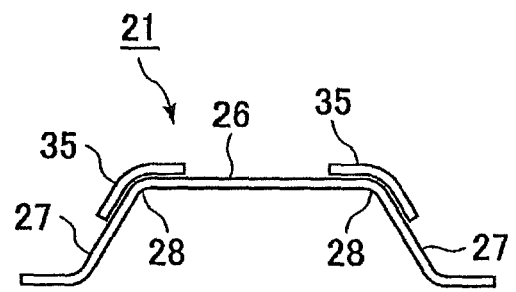

Fig. 11
(a)
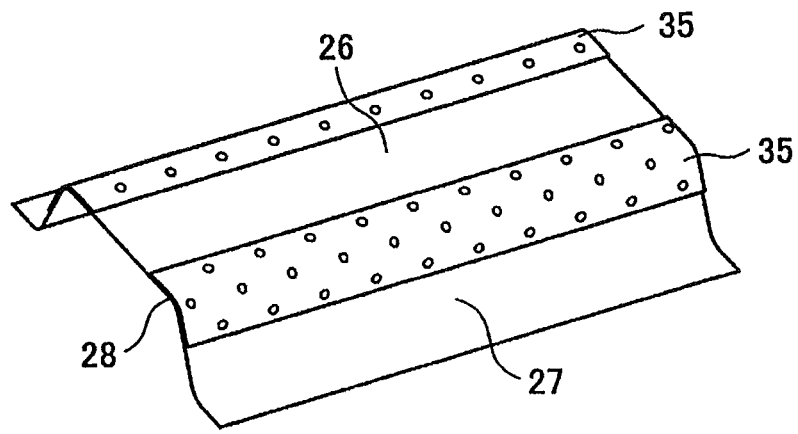
(b)
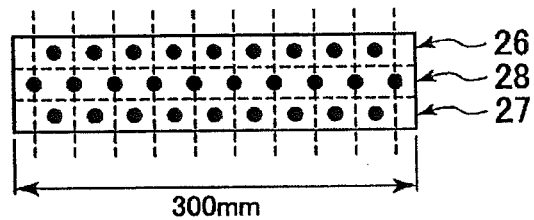
(c)
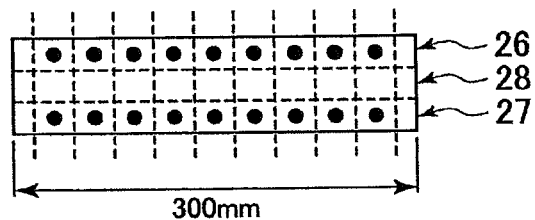

Fig. 12

| | Cross-sectional view of formed member | Cross-sectional shape | Strength (MPa) | Location of weld of reinforcing members | Weld in ridge portion |
|---|---|---|---|---|---|
| Comparative Example 1 | | one-sided hat | 270 | 2 locations on hat bottom | no |
| Comparative Example 2 | | one-sided hat | 980 | 2 location on hat bottom | no |
| Example 1 | | one-sided hat | 270 | 2 locations on hat bottom | yes + side wall |
| Example 2 | | one-sided hat | 980 | 2 locations on hat bottom | yes + side wall |

Fig. 14
(a)
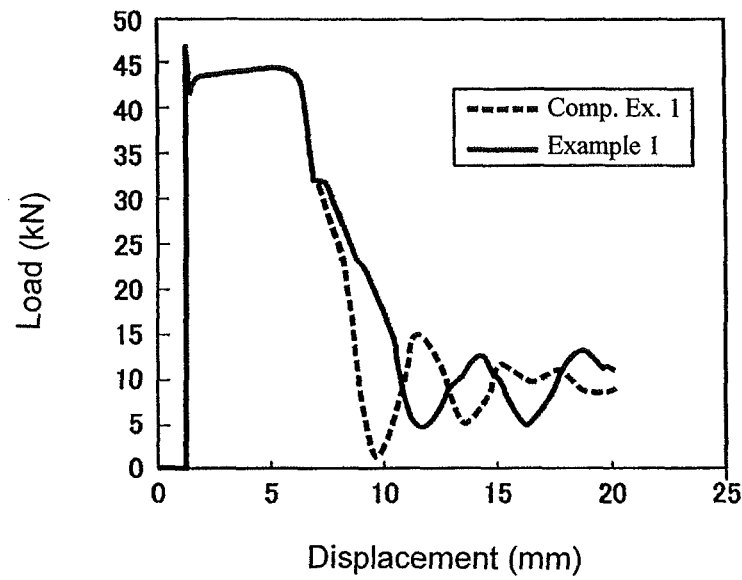
(b)
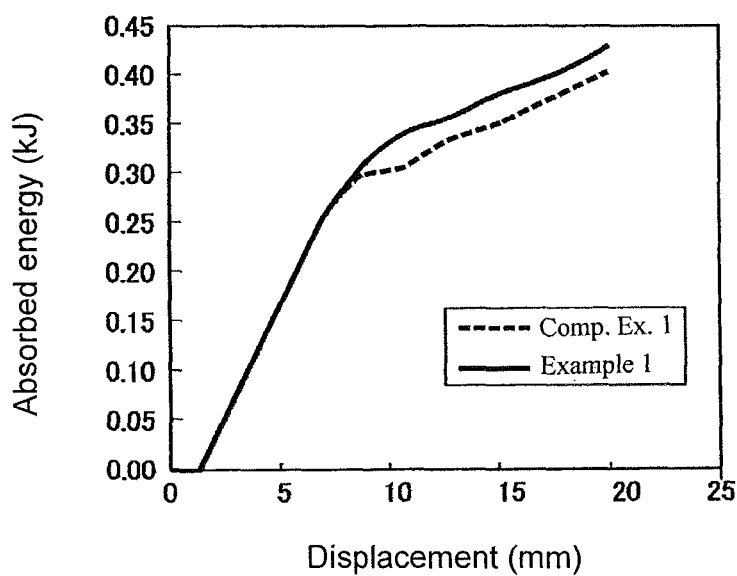

Fig. 15
(a)
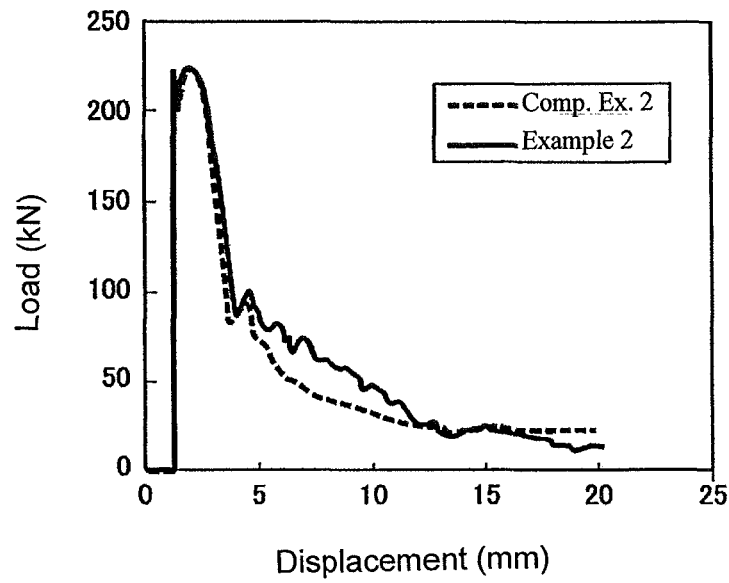
(b)
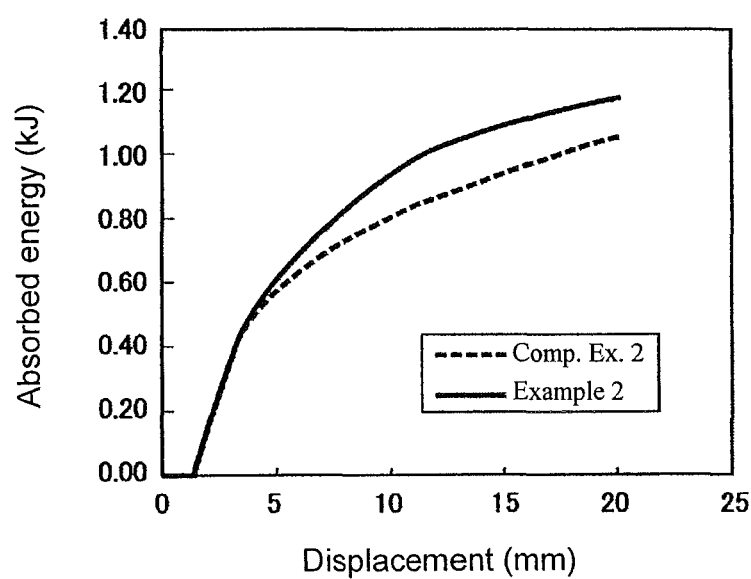

Fig. 19

| No. | Fabrication steps | Shape in batch TWB | Cross-sectional shape | Max. load | Note |
|---|---|---|---|---|---|
| 1 | HP forming → assembly Welding: spot welding | none | 17mm | 47.2kN | Comparative example |
| 2 | TWB → HP forming Welding: spot welding | 600mm, 250mm, 180mm | 16mm, 17mm | 50.5kN | Comparative example |
| 3 | TWB → HP forming Welding: spot welding | | 16mm, 17mm | 62.0kN | This invention |
| 4 | TWB → HP forming Welding: seam welding | | 16mm, 17mm | 75.0kN | This invention |
| 5 | TWB → HP forming Welding: seam welding + spot welding | | omitted | 65.0kN | This invention |
| 6 | TWB → HP forming Welding: laser welding | | omitted | 56.0kN | This invention |

FORMED MEMBER AND MANUFACTURING METHOD THEREOF

TECHNICAL FIELD

This invention relates to a formed member and a method for its manufacture. Specifically, the present invention relates to a formed member which can be manufactured at a low cost and has improved dimensional accuracy, which has improved axial crushing properties and three-point bending properties or improved bending stiffness and torsional stiffness and which is therefore suitable for use in components of automobiles. It also relates to a method for its manufacture.

BACKGROUND ART

As is well known, almost all automobile bodies are monocoque bodies (unit construction bodies) in order to achieve both a lightweight and a high stiffness.

FIG. 20 is an explanatory view schematically showing an automobile body 1.

A monocoque automobile body is usually constructed by assembling a large number of components which are fabricated by press forming of a steel sheet having a thickness of at most 2.0 mm into a specified shape and connecting them by spot welding, for example. These many components for an automobile body (referred to below as automotive components) include, for example, a front side member 2, a bumper reinforcement 3, a front crash box 4, a front upper rail 5, a side sill 6, a floor cross member 7, a floor panel 8, a center pillar 9, a roof rail side member 10, a rear side member 11, and a rear crash box 12. In order to guarantee the required stiffness of the vehicle body, these components are constituted by one or more formed member body portions such as press-formed member body portions or roll-formed member body portions.

The term "formed member body portion" used herein means a body portion of a member in which the body portion has a ridge formed by a suitable bending technique such as press forming or roll forming of a sheet. In this description, it will be referred to for convenience as simply a formed member.

FIG. 21 shows an example of a formed member 13 which was fabricated by press forming of a flat sheet blank into a hat shape in cross section. Specifically, FIG. 21 is an explanatory view schematically showing the structure of a front side member, which is one example of an automobile component 15 which is constituted by assembling the formed member 13 and a flat closing plate 14.

As shown in FIG. 21, the formed member 13 has ridge portions 13c which connect one surface 13a with other surfaces 13b, as a result of which the stiffness of the automobile component 15 is increased.

Patent Document 1 discloses an invention in which a ridge portion of a formed member is a folded portion which is formed by folding a steel sheet. Patent Document 2 discloses an invention in which a built-up weld is provided on a ridge portion of a formed member. Patent Documents 3-5 disclose inventions in which quenching is carried out on a portion where a formed member requires strength to form a quench hardened portion.

In addition, Patent Documents 6 and 7 disclose inventions in which formed members are manufactured by inserting a brazing filler metal between two steel sheets, which are materials being worked, and performing brazing and shaping in a so-called hot pressing step.

PRIOR ART DOCUMENTS

Patent Documents

Patent Document 1: JP 2008-155749 A
Patent Document 2: JP 2004-276031 A
Patent Document 3: JP 04-72010 A
Patent Document 4: JP 11-152541 A
Patent Document 5: JP 10-17933 A
Patent Document 6: JP 2001-310223 A
Patent Document 7: JP 2011-88484 A

SUMMARY OF THE INVENTION

In the invention disclosed in Patent Document 1, a special die is necessary to form a folded portion, resulting in an increase of equipment costs. In the invention disclosed in Patent Document 2, costs increase due to forming a built-up weld. In the inventions disclosed in Patent Documents 3-5, not only do costs increase due to forming a quench hardened portion, but there is a concern of a decrease in dimensional accuracy due to deformation of the formed member by quenching.

The physical properties (melting point, strength, and elongation) of steel sheets and brazing filler metals (such as Pb, Cu, and Ag) are very different from each other. Therefore, the inventions disclosed in Patent Documents 6 and 7 have the following problems.

(a) A brazing filler metal utilizes melting of a low melting point metal. Therefore, in a hot pressing step, two steel sheets undergo press forming in a state in which a brazing filler metal in a molten state is sandwiched between them. At this time, the molten brazing filler metal penetrates into the grain boundaries of the steel, thereby causing so-called liquid metal embrittlement. In the embrittled grain boundaries, the brazing filler metal may peel off due to the strains applied by press forming, and it is very possible that a desired formed member cannot be manufactured.

(b) Even if a formed member can be manufactured, a brazing filler metal which is greatly different from steel with respect to physical properties such as strength and elongation is unavoidably present between two steel sheets. Therefore, when a formed member which is mounted on a vehicle body receives an impact load and undergoes axial crushing deformation or bending deformation, fracture easily takes place in the brazing metal itself or in the interface between the brazing metal and the steel sheets, and the fracture makes it impossible to increase the ability of the formed member to absorb impact energy.

The present inventors found that a composite material which has a simple structure and which can be manufactured by simple means even when it has a complicated shape, namely, a composite material which is formed by welding a reinforcing member to a ridge portion by a weld which is located in a region close to the center of the ridge portion has improved energy absorbing properties when it receives such an impact load.

The present invention is a formed member such as a press-formed member or a roll-formed member having at least one ridge portion connecting one surface and another surface, characterized by having a reinforcing member connected at least to the ridge portion and by having a weld to the reinforcing member provided on the ridge portion.

In the present invention, a ridge portion means a bent portion connecting one surface and another surface. When the one surface and the other surface are both flat surfaces, the ridge portion means the curved region between the two flat surfaces. When one or both of the one surface and the other surface are curved surfaces having a radius of curvature, the ridge portion means the region which connects the one surface and the other surface and which has a radius of curvature which is smaller than the radius of curvature of each surface to which it is connected. Accordingly, a ridge portion is specifically a bent portion which has been deformed by press forming, for example. Namely, it is a portion which has undergone bending deformation. The direction of its ridge line (the direction in which the ridge extends) is referred to the extending direction of the ridge portion.

From another standpoint, the present invention is a method of manufacturing a formed member having at least one ridge portion characterized by welding a flat reinforcing member to a flat sheet blank for the formed member at a location of the blank which becomes a ridge portion and performing press forming or roll forming on the blank having the reinforcing member welded thereto was welded to manufacture a bent formed member having at least one ridge portion. The blank having the reinforcing member welded thereto may undergo press forming after being heated to a temperature of at least the $Ac_3$ point. Namely, the press forming may be so-called hot press forming.

In general, the hardness of the weld metal in a weld of carbon steel is higher than the hardness of the base metal. Therefore, when carrying out press working after welding to form a ridge portion, if the deformation applied to the welded portion is extremely severe, there is an increased possibility of fracture of welds on the ridge portion during press forming. In contrast, if hot press forming is carried out at a high temperature of 950° C. or higher, due to an increased plastic deformability of the weld of the ridge portion, it is possible to conduct press forming to a more extreme shape.

If welding of a high tensile strength steel sheet is performed after hot press forming and if the hot press forming causes the high tensile strength steel sheet to have a martensitic structure with a strength of around 1500 MPa, for example, the steel sheet, which has been hardened due to the martensitic structure, necessarily develops a softening region formed by the heat at the time of welding (so-called HAZ softening), and the hardness of the steel sheet decreases by around 30%. As a result, there is a possibility of fracture of the welded joint in the softened region.

In contrast, as stated above, in an embodiment of the present invention in which welding is followed by hot forming, a flat reinforcing member is welded to a flat sheet blank, and at this time, a weld is formed in a region at the center of bending at the time of press forming, namely, at the location which becomes a ridge portion. The blank to which a reinforcing member was welded in this manner is then heated to a temperature of at least the $Ac_3$ point and subjected to press forming Due to heating at this time, the thermal history of previous welding is erased, and during cooling after press working, the base metal and the weld portion which underwent HAZ softening at the time of welding are both hardened. Since the degree of hardening is primarily influenced by the carbon content of the steel, the hardness becomes uniform in the base metal and the HAZ which have the same steel composition.

Namely, according to the present invention, if a bonding area (such as a weld nugget diameter) suitable for the strength of a hardened base metal is guaranteed, it is possible to obtain a formed member having a joint strength matching the strength of the hardened base metal.

In the present invention, it is preferable that (a) a weld be provided continuously or intermittently in the extending direction of the ridge portion, (b) a weld be provided along a straight line or a curve in the extending direction of the ridge portion, (c) a weld be provided between the center in the direction of the cross-sectional circumference of the ridge and a position at a distance of 50% of the cross-sectional circumference of the ridge, or (d) a weld be a spot weld, a seam weld, a laser weld, or a plasma weld. The weld may be provided over the entire surface of the ridge portion. The welding method may be one or more methods selected from various welding methods including spot welding, seam welding, laser welding, and plasma welding.

The method for forming the ridge portion may be either press forming or roll forming. Press forming or roll forming may be performed on superposed flat sheet blanks which underwent welding. Of course, the formed member body portion and the reinforcing member may previously be subjected to forming separately, and the reinforcing member and the formed member body portion which were both formed are joined to each other by welding so as to form a weld on the ridge portion of the formed member body portion.

In the present invention, it is possible for the reinforcing member to (e) extend over all or a portion of the extending direction of the ridge portion, (f) extend in the extending direction of the ridge portion with forming one part or two or more divided parts, (g) have dimensions which can cover at least the entirety of the cross section of the ridge portion, or (h) be provided on the outer peripheral surface or the inner peripheral surface of the ridge portion.

According to the present invention, a formed member are provided which can be inexpensively manufactured, which has improved dimensional accuracy, which has improved axial crushing properties and three-point bending properties or improved bending stiffness and torsional stiffness, and which is therefore suitable for use in a component for an automobile and a method for its manufacture.

BRIEF EXPLANATION OF THE DRAWINGS

FIGS. 8(a)-8(c) are explanatory views showing the state in which the present invention is applied to a center pillar (a B-pillar), wherein FIG. 8(a) is an overall view, FIG. 8(b) is a cross-sectional view taken along line VIII-VIII of FIG. 8(a) and shows a conventional example, and FIG. 8(c) is a cross-sectional view taken along line VIII-VIII of FIG. 8(a) and shows an example of the present invention.

FIGS. 9(a)-9(c) are explanatory views showing the state in which the present invention is applied to a front pillar (an A-pillar), wherein FIG. 9(a) is an overall view, FIG. 9(b) is a cross-sectional view taken along line XI-XI of FIG. 9(a) and shows a conventional example, and FIG. 9(c) is a cross-sectional view taken along line XI-XI of FIG. 9(a) and shows an example of the present invention.

FIG. 10(a) is an explanatory view showing the approximate shape of the cross section of a reinforcing member used in an example, and FIG. 10(b) is an explanatory view showing the shape and disposition of reinforcing members on ridge portions.

FIG. 11(a) is a perspective view of a formed member after spot welding of reinforcing members, and FIGS. 11(b) and 11(c) are explanatory views showing the locations where a reinforcing member was spot welded to a ridge portion.

FIG. 12 is an explanatory view summarizing test conditions.

FIG. 14(a) is a graph showing the relationship between the displacement and load for Comparative Example 1 and Example 1 of a formed member, and FIG. 14(b) is a graph showing the relationship between the displacement and absorbed energy for Comparative Example 1 and Example 1 of a formed member.

FIG. 15(a) is a graph showing the relationship between the displacement and load for Comparative Example 2 and Example 2 of a formed member, and FIG. 15(b) is a graph showing the relationship between the displacement and absorbed energy for Comparative Example 2 and Example 2 of a formed member.

FIG. 19 is an explanatory view showing the test conditions and the test results (maximum load) for Nos. 1-6.

Figure 1:
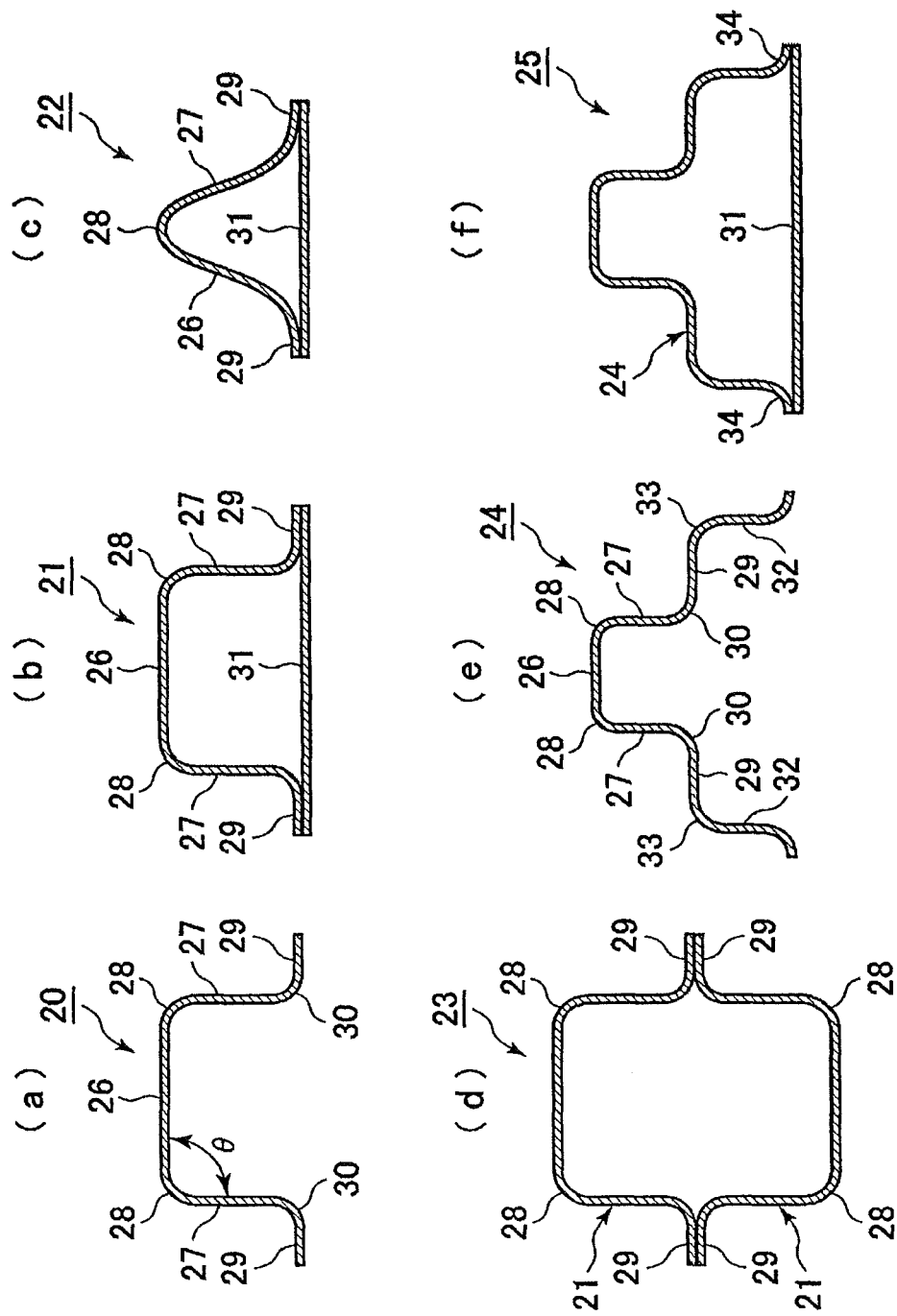
FIGS. 1(a)-1(f) are explanatory views schematically showing transverse cross-sectional shapes of various types of formed members from which reinforcing members are omitted.

EXPLANATION OF REFERENTIAL NUMBERS 15 automobile component
20-25 formed members produced by bending (bent formed member)
26 one surface
27 another surface
28 first ridge portion
28-1 portion requiring resistance to axial crushing
28-2 portion requiring resistance to bending deformation
29 one surface
30 second ridge portion
31 closing plate
32 another surface
33 third ridge portion
34 flange
35 reinforcing member
35-1 first reinforcing member
35-2 second reinforcing member

MODES FOR CARRYING OUT THE INVENTION

The present invention will be explained in detail while referring to the attached drawings. In the following explanation, an example will be given of the case in which a formed member according to the present invention is a component of an automobile. The present invention will be explained by the cross section of a formed member with respect to press forming as an example of a forming method.

A formed member according to the present invention comprises a formed member body portion having at least one ridge portion which connects one surface and another surface, and a reinforcing member which is connected to at least the ridge portion of the formed member body portion. Namely, a weld of the body portion to the reinforcing member is provided on the ridge portion of the formed to member. In this description, in order to simplify the explanation, the formed member body portion will sometimes be referred to for convenience as the formed member.

As stated below, the formed member body portion is, for example, a press-formed member manufactured by press forming or a roll-formed member manufactured by roll forming. The formed member constitutes a component of an automobile either by itself or together with other member or members.

FIGS. 1(a)-1(f) are explanatory views schematically showing various transverse cross-sectional shapes of formed members 20-25. In FIGS. 1(a)-1(f), reinforcing members (not shown) are joined to the ridge portions by welding. The same referential numbers indicate the same portions.

The formed member 20 shown in FIG. 1(a) has first and second ridge portions 28, 28 which connect a surface 26 with other surfaces 27, 27, and third and fourth ridge portions 30, 30 which connect surfaces 29, 29 with other surfaces 27, 27. The formed member 20 has a reinforcing member which is joined to at least one of the four ridge portions 28, 28, 30, and 30. Formed member 20 may by itself constitute a component of an automobile.

The formed member 21 shown in FIG. 1(b) is an example having a reinforcing member which is joined to at least one ridge portion of the first and second ridge portions 28, 28. The formed member 21 and a flat closing plate 31 which is spot welded to surfaces (flanges) 29, 29 of the formed member 21 may together constitute a component of an automobile.

The formed member 22 shown in FIG. 1(c) has a reinforcing member joined to a first ridge portion 28. The formed member 22 may constitute a component of an automobile together with a flat closing plate 31 which is spot welded to surfaces (flanges) 29, 29 of the formed member.

The formed member 23 shown in FIG. 1(d) combines two of the above-described formed members 21 by spot welding through their respective surfaces (flanges) 29, 29 and may constitute a component of an automobile.

The formed member 24 shown in FIG. 1(e) has first and second ridge portions 28, 28 which connect surface 26 with other surfaces 27, 27, third and fourth ridge portions 30, 30 which connect surfaces 29, 29 with surfaces 27, 27, and fifth and sixth ridge portions 33, 33 which connect surfaces 29, 29 with other surfaces 32, 32. The formed member 24 has a reinforcing member which is joined to at least one of the ridge portions 28, 28, 30, 30, 33, 33. The formed member 24 may by itself constitute a component of an automobile.

The formed member 25 shown in FIG. 1(f) may constitute a component of an automobile together with a flat closing plate 31 which is spot welded to surfaces (flanges) 29, 29 of the above-described formed member 24.

The internal angle of the ridge portions 28, 30, and 33 (the angle θ shown in FIG. 1(a)) need not be 90 degrees and may be any angle required by the formed members 20-25.

The illustrated ridge portions are disposed so as to be symmetrical as a whole, but they need not be symmetrical.

FIG. 2(a) is an explanatory view showing the state in which reinforcing members 35, 35 are welded to ridge portions 28, 28 of the formed member 20 shown in FIG. 1(a), FIG. 2(b) is an explanatory view showing the state in which reinforcing members 35, 35, 35, 35 are welded to ridge portions 28, 28, 28, 28 of the formed member 23 shown in FIG. 1(d), and FIG. 2(c) is an explanatory view showing the state in which first reinforcing members 35-1, 35-1 are welded to a region from ridge portions 28, 28 to ridge portions 30, 30 and second reinforcing members 35-2, 35-2 are welded to ridge portions 33, 33 of the formed member 24 shown in FIG. 1(e). In these figures, the welds provided on the ridge portions 28, 30, and 33 have been omitted for the clarity of the drawings.

Here, examples are shown in which a reinforcing member covers only a region on the cross section of a ridge portion. This is because even though securing a reinforcing member to a ridge portion by welding is effective at improving the properties of a deformed member, a reinforcing member increases the weight of the member as a whole. The "cross section of a ridge portion" used herein means a cross section of a ridge portion in the direction perpendicular to the longitudinal direction of the formed member.

In the present invention, it is preferable to carry out press forming or roll forming after welding of the reinforcing members. This is because the entirety of the ridge portion, namely, the bent portion (the base body portion+ the reinforcing member) is preferably formed as a single member with no gaps between the body portion and the reinforcing member.

As shown in FIGS. 2(a)-2(c), it is sufficient for the reinforcing members 35, 35-1, and 35-2 to have widthwise dimensions such that they can cover the entirety of the ridge portions 28, 30, and 33 in the circumferential direction of a cross section. As shown by the enlargement in FIG. 2(a), when the internal angle of the ridge portions 28, 30, 33 is θ (radians) and the radius of curvature is R (mm), the length in the circumferential direction of the cross sections of the ridge portions 28, 30, and 33 becomes Rθ (mm). Therefore, the width of the reinforcing members 35 is preferably at least Rθ (mm). Based on the shape of an actual formed member, the internal angle θ is at least 60 degrees and at most 120 degrees, for example.

FIGS. 2(a) and 2(b) show examples in which reinforcing members 35 are provided on the outer peripheral surface of ridge portions 28, and FIG. 2(c) shows an example in which reinforcing members 35-1 and 35-2 are provided on both the outer peripheral surface and the inner peripheral surface of ridge portions 28 and 30. It is also conceivable to provide a reinforcing member on both the outer peripheral surface and the inner peripheral surface of a single ridge portion. The terms "outer peripheral surface" and "inner peripheral surface" used herein respectively refer to a convex surface and a concave surface of a ridge portion.

It is not necessary to prescribe the width of the welds for welding the reinforcing members 35, 35-1, and 35-2 to each of the ridge portions 28, 30, and 33 (the length in the circumferential direction of a cross section) as long as the reinforcing members 35, 35-1, and 35-2 do not significantly peel from the ridge portions 28, 30, and 33 as a result of the load applied at the time of the below-described press forming. However, it is of course preferable that peeling not take place when a large deformation occurs due to a load. When, for example, the welds are spot welds, the nugget diameter of the welds is preferably at least $3(t)^{1/2}$ (mm) wherein t is the thickness (mm) of the reinforcing member 35. In this manner, the width of the welds is preferably a large proportion of the length Rθ in the circumferential direction of a cross section of the ridge portions 28, 30, and 33 in order to maintain desired properties of the formed members 20-25, and a plurality of welds are preferably present on each ridge portion.

A weld is preferably provided in a region from the center in the circumferential direction of the cross sections of the ridge portions 28, 30, and 33 to a position at a distance of 50% of the circumferential length of the cross sections of the ridge portions 28, 30, and 33. By doing so, it is possible to obtain the effects of the present invention with certainty.

The entire width of a weld need not be contained in a region for a ridge portion having a length of Rθ in the circumferential direction of a cross section of the ridge portions 28, 30, and 33. It is sufficient for at least a portion of a weld to be contained in the region of a ridge portion.

Basically, the greater the width of the reinforcing members 35, 35-1, and 35-2, the greater is the effect of reinforcing the bent formed members 20-25 by the reinforcing members 35, 35-1, and 35-2. However, as the width of a reinforcing member increases, an increase in the weight and cost of components of an automobile cannot be avoided. Therefore, the width of the reinforcing members 35, 35-1, and 35-2 is preferably slightly larger than the length Rθ in the circumferential direction of the cross sections of the ridge portions 28, 30, and 33, and specifically it is preferably at most Rθ×5, more preferably at most R·θ×4, and most preferably at most Rθ×3.

When the cross-sectional shape of the formed members 20-25 in the extending direction of the ridge portions 28, 30, and 33 is constant and does not vary, the effect of the present invention can be obtained by providing the reinforcing members 35, 35-1, and 35-2 over the entire length in the extending direction of the ridge portions 28, 30, and 33.

However, many actual formed members have a cross-sectional shape in the extending direction of the ridge portions 28, 30, and 33 which is not fixed and varies with the location. In this case, the formed members 20-25 have a region where their cross-sectional area is small and where they most easily deform when bearing a load such as a load in the axial crushing direction. Therefore, it is effective to provide reinforcing members 35, 35-1, and 35-2 at least in this region. Even if reinforcing members 35, 35-1, and 35-2 are not provided over the entire length in the axial direction of the formed members 20-25, it is possible to obtain the effects of the present invention with greater certainty by providing the reinforcing members 35, 35-1, and 35-2 in such a region having a small cross-sectional area. Of course, it is possible to obtain a greater effect by providing the reinforcing members 35, 35-1, and 35-2 over the entire length in the axial direction of the formed members 20-25.

The location of welds in the extending direction of the ridge portions 28, 30, and 33 can be suitably set in accordance with formability at the time of forming and the properties required of the formed member. The shape of welds such as dots, straight lines, or curves, the number of welds, and the dimensions (length) of the welds can be suitably set. It is possible to provide both dot-shaped welds and elongated welds and to provide both linear welds and curved welds.

The term "extending direction" of a ridge portion used herein means the lengthwise direction, namely, the axial direction of the ridge portion because the ridge portion is provided in the lengthwise direction of a formed member. The term "cross-sectional shape of a ridge portion" means the shape of a ridge portion in a cross section perpendicular to the lengthwise direction.

Figure 2:
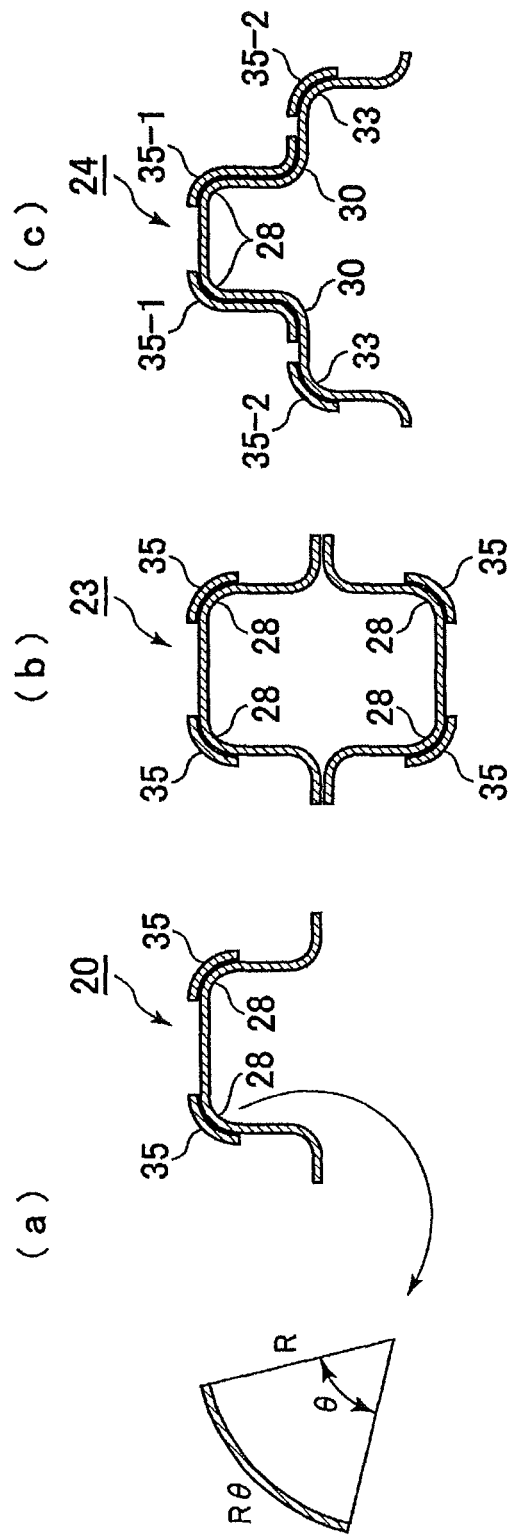
FIG. 2(a) is an explanatory view showing the state in which a reinforcing member has been welded to each of the first ridge portions of the formed member shown in FIG. 1(a)
FIG. 2(b) is an explanatory view showing the state in which a reinforcing member has been welded to each of the first ridge portions of the bent formed members shown in FIG. 1(d)
FIG. 2(c) is an explanatory view showing the state in which first reinforcing members have been welded to a region from the first ridge portions to the second ridge portions and second reinforcing members have been welded to third ridge portions of the bent formed member shown in FIG. 1(e).

FIGS. 3(a)-3(d) are perspective views partially showing the installation positions of welds 40 in the extending direction of a ridge portion 28 for the case in which the welds 40 are dot-shaped spot welds. The circles in FIGS. 3(a)-3(d) show the welds 40. In the illustrated examples, the case will be explained in which a reinforcing member 35 on the outer peripheral surface of a ridge portion 28 provided on a formed member 20 shown in FIG. 2 is joined to the ridge portion 28 by welding. For convenience, the ridge portion 28 is shown as the ridge portion of the reinforcing member 35. The same is the case with respect to below-described FIGS. 4-7.

Figure 3:
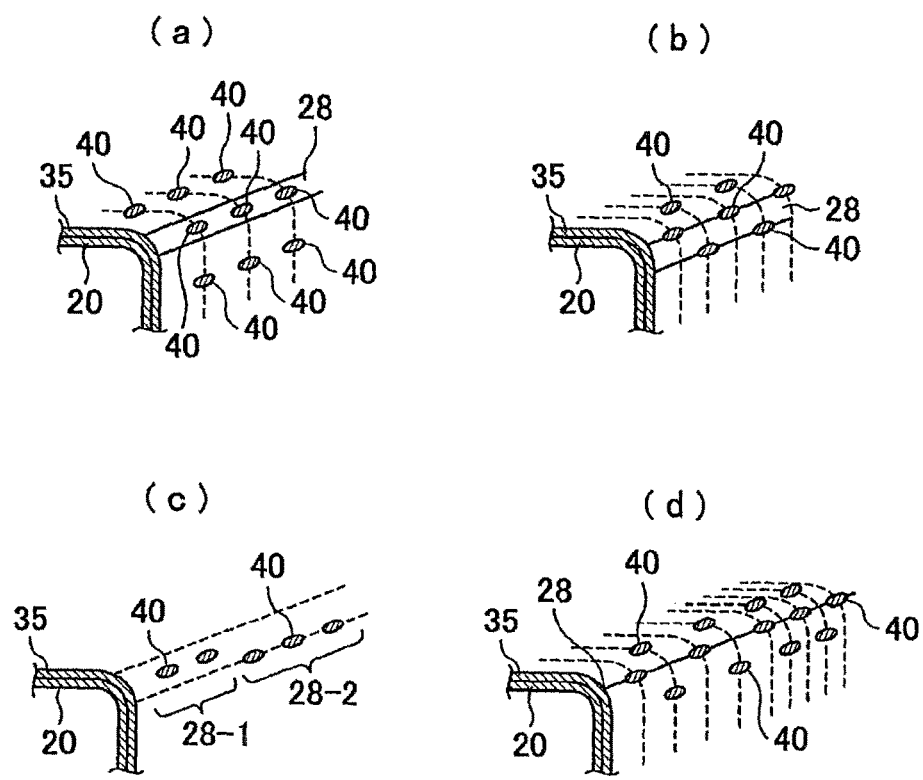
FIGS. 3(a)-3(d) are partial perspective views of the locations of welds provided in the extending direction of a ridge portion when welds are dot-shaped spot welds.
Figure 4:
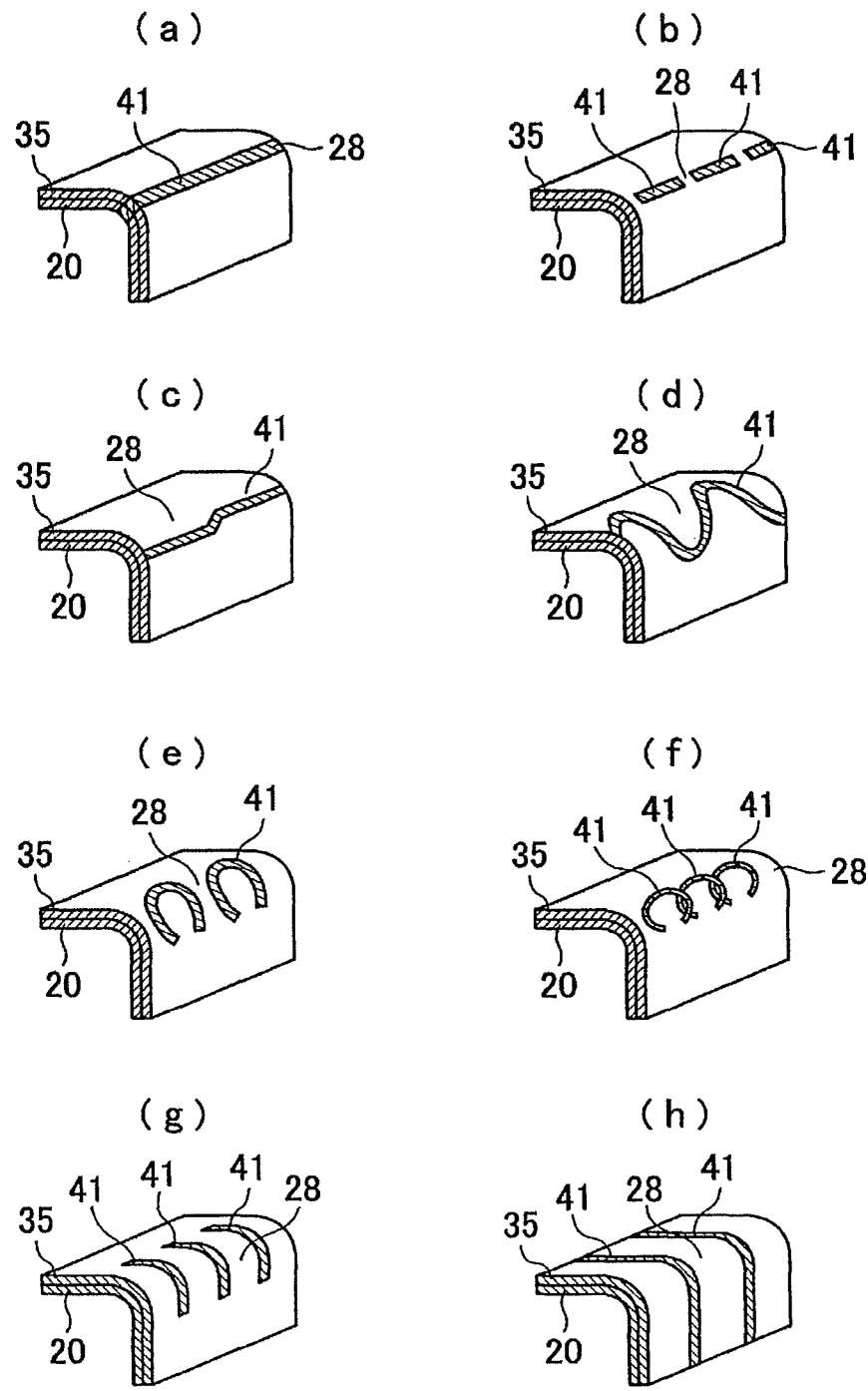
FIGS. 4(a)-4(h) are explanatory views schematically showing the locations of welds provided in the extending direction of a ridge portion for the case in which the welds are elongated welds.
Figure 5:
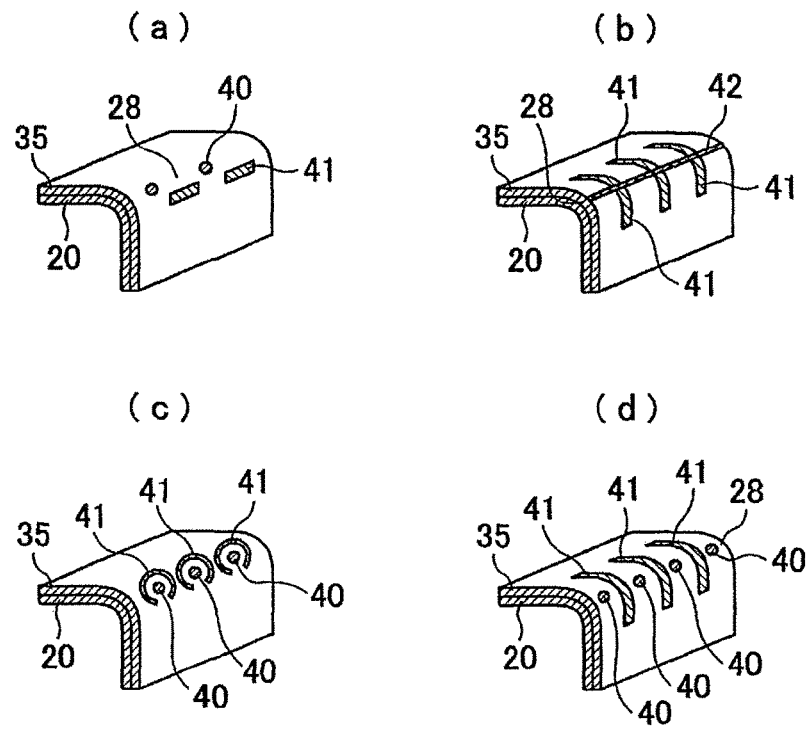
FIGS. 5(a)-5(d) are explanatory views showing the case in which welds are a combination of elongated welds and dot-shaped welds.
Figure 6:
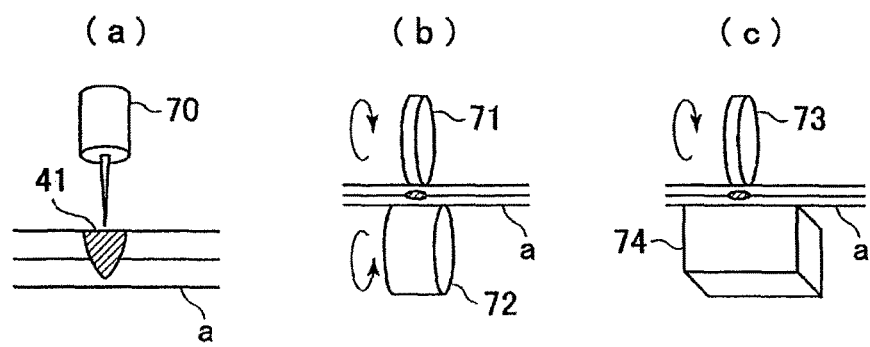
FIGS. 6(a)-6(c) are explanatory views schematically showing an example of a welding method for the case in which a weld is formed in a location where good quality of external appearance is required.
Figure 7:
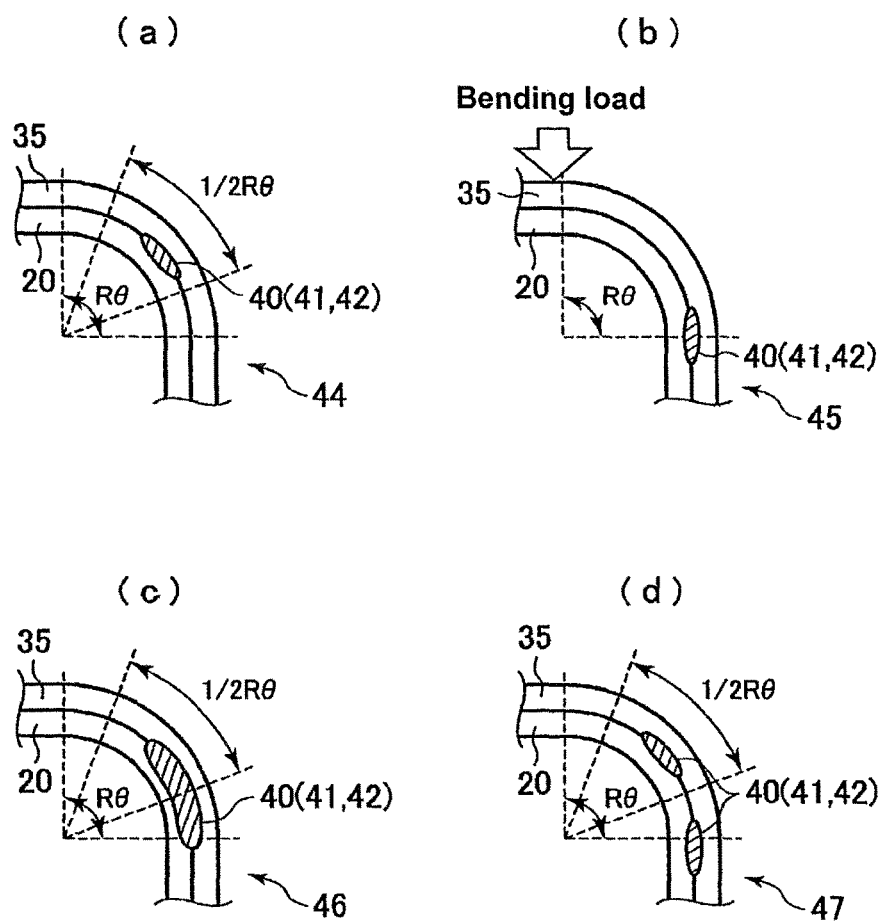
FIGS. 7(a)-7(d) are explanatory views schematically showing preferred locations for forming welds on a formed member.

FIG. 3(a) shows the case in which the welds 40 are disposed in the same cross sections in the extending direction of the ridge portion 28. This arrangement has the effect of making it easy to control formability and deformation in one direction.

FIG. 3(b) shows the case in which welds 40 are staggered in the extending direction of the ridge portion 28. This arrangement can increase the number of welds 40 per unit area and so can improve the properties of the formed member.

FIG. 3(c) shows the case in which the locations where the welds 40 are formed vary in accordance with their positions in the extending direction of the ridge portion 28. For example, by having different locations where the welds 40 are formed in a portion 28-1 of the ridge portion 28 which requires resistance to axial crushing and a portion 28-2 which requires resistance to bending deformation, the resistance to axial crushing and the resistance to bending deformation of the formed member can both be increased. In this manner, by varying the location where welds 40 are formed in accordance with the location in the extending direction of the ridge portion 28, it is possible to flexibly cope with various demands made of a formed member.

FIG. 3(d) shows the case in which the pitch of the welds 40 varies in the extending direction of the ridge portion 28. In the same manner as in FIG. 3(c), this arrangement can flexibly cope with various demands of a formed member.

FIGS. 4(a)-4(h) are explanatory views schematically showing the positions of welds 41 in the extending direction of a ridge portion 28 for the case in which each weld is an elongated weld 41.

FIG. 4(a) shows the case in which a weld 41 is formed with a linear shape extending continuously in the extending direction of a ridge portion 28.

FIG. 4(b) shows the case in which welds 41 are formed as intermittent linear portions extending in the extending direction of a ridge portion 28.

FIG. 4(c) shows the case in which a weld 41 is formed with a linear shape which is continuous in the extending direction of a ridge portion 28 and which changes its position along the way.

FIG. 4(d) shows the case in which a weld 41 is formed as a continuous curve generally extending in the extending direction of the ridge portion 28.

FIG. 4(e) shows the case in which welds 41 having the shape of a C are spaced from each other and continuously arranged in the extending direction of a ridge portion 28.

FIG. 4(f) shows the case in which welds 41 having the shape of a C are continuously arranged in the extending direction of the ridge portion 28 so as to cross each other in portions.

FIG. 4(g) shows the case in which welds 41 having the shape of stitches in the cross-sectional direction are sequentially spaced in the extending direction of the ridge portion 28.

FIG. 4(h) shows the case in which continuous welds 41 in the cross-sectional direction are sequentially spaced in the extending direction of the ridge portion 28.

FIGS. 5(a)-5(d) are explanatory views schematically showing the case in which welds are a combination of elongated welds and dot-shaped welds. The dot-shaped welds may be formed by spot welding or by laser welding. The elongated welds may be formed by laser welding or by seam welding.

FIG. 5(a) shows the case in which dot-shaped welds 40 and elongated welds 41 are combined. FIG. 5(b) shows the case in which elongated welds 41 are combined with an elongated weld 42 extending in a different direction. FIG. 5(c) shows the case in which C-shaped welds 41 are combined with dot-shaped welds 40. FIG. 5(d) shows the case in which elongated welds 40 in the direction perpendicular to the extending direction of the ridge portion are combined with dot-shaped welds 40.

In this manner, a reinforcing member 35 may extend over all or a portion of the extending direction of a ridge portion 28, and it may be a single member or may be divided into two or more pieces in the extending direction of a ridge portion 28.

The welds 40-42 for welding the reinforcing member 35 to the ridge portion 28 prevent gaps from developing between the reinforcing member 35 and the formed member 20 when an external force is applied to the formed member 20, thereby providing the effect of improving the performance under a stress which causes axial crushing or bending deformation or the effect of markedly increasing bending stiffness and torsional stiffness. Therefore, it is most preferable for the welds 40-42 to be continuously formed along the extending direction of the ridge portions 28. However, it is possible to form them intermittently in the extending direction of the ridge portion 28 such as is the case with spot welding. When welds 40-42 are intermittently formed in the extending direction of a ridge portion 28, the spacing between adjoining welds is suitably set so that the reinforcing member 35 does not detach from the ridge portion 28 at the time of deformation.

When a component of an automobile made from a formed member is a floor panel, for example, there is a tendency for the length Rθ in the circumferential direction of a cross section of the ridge portion to be long. In this case, it is not necessary for the weld to extend linearly in the extending direction of the ridge portion, and it can have a curved shape such as an S shape, or it can be in the form of staggered short lines or dots. Namely, the welds can be suitably formed so that the reinforcing member does not detach from the ridge portion when the formed member receives an external force.

When the reinforcing member 35 covers not just the ridge portion 28 but also a surface contiguous to the ridge portion 28 (such as a vertical wall portion of a member with a hat-shaped cross section), not only the ridge portion 28 but this surface as well may of course be welded.

When the formed member 20 undergoes axial crushing deformation, if the cross-sectional shape does not change in the extending direction of the ridge portion 28, deformation at the time of axial crushing is concentrated at the ends of the formed member 20. Therefore, in order to prevent the materials from sliding between the formed member 28 and the reinforcing member 35 at the ridge portion at the time of press forming or to prevent the materials from undergoing different deformation from each other, welds are more densely provided at the end portions and particularly in the portions where the cross-sectional shape varies. In this manner, it is important to reduce by means of welding the area of gaps between the ridge portion 28 and the reinforcing member 35 at both ends of the formed member 20 and, when the cross-sectional shape varies, to reduce by means of welding the area of gaps between the ridge portion 28 and the reinforcing member 35 in the vicinity of the region where the cross-sectional shape varies. When welds are discontinuously formed such as with spot welding, the spacing between adjoining welds 40-42 in these portions is preferably set to a small value.

There are no particular limitations on the welding method. For example, spot welding, seam welding, laser welding, or plasma welding can be used. As stated below, any welding method capable of welding between a flat reinforcing member and a flat sheet blank in a state that the reinforcing member is superposed on a portion of the blank is equally applicable.

FIGS. 6(a)-6(c) are explanatory views schematically showing an example of a welding method for the case in which welds 40-42 are formed in a portion where external appearance with good quality is required.

When a good quality external appearance is required on a whole or portion of a surface of a formed member after assembly, namely, when it is required to have a clean external appearance in which surface irregularities such as weld beads or electrode marks produced by resistance welding do not remain, the methods shown in FIGS. 6(a)-6(c) are preferred.

Referential number 70 in FIG. 6(a) indicates a laser welding machine. As shown in FIG. 6(a), by carrying out laser welding so that the resulting weld bead 41 does not reach the surface a which becomes the outer surface of a ridge portion, a good quality external appearance of surface a can be maintained when carrying out laser welding of a reinforcing member 35 to a ridge portion 28.

Referential numbers 71 and 72 in FIG. 6(b) indicate electrodes for seam welding. As shown in FIG. 6(b), in seam welding, a good quality external appearance of surface a can be maintained by disposing a disc-shaped electrode 72 for seam welding having a larger contact surface on the side of surface a and carrying out welding while rotating the electrodes.

In FIG. 6(c), referential number 73 indicates an electrode for one-sided seam welding and referential number 74 indicates a flat back electrode. As shown in FIG. 6(c), in one-sided seam welding, a good quality external appearance of surface a can be maintained by disposing the flat back electrode 74 on the side of surface a and performing welding while rotating the electrode 73 on surface b (so-called one-sided seam welding).

In spot welding, a good quality external appearance can be maintained without leaving electrode marks on surface a by using a flat back electrode or an electrode having a tip with a large radius of curvature.

A formed member according to the present invention can be preferably used either by itself or in combination with other member or members in a component for an automobile such as a front side member, a bumper reinforcement, a front crash box, a front upper rail, a side sill, a floor cross member, a floor panel, a center pillar, a roof rail side, a rear side member, or a rear crash box. Alternatively, a formed member according to the present invention may constitute a portion of such a component for an automobile. Namely, a reinforcing member according to the present invention may be secured to portions of the above-described components for automobiles by a weld provided on a ridge portion of a component.

In this description, in order to simplify the explanation, a component for an automobile like those described above will sometimes itself be referred to as a formed member according to the present invention.

When, for example, the present invention is applied to a floor panel having a tunnel portion (a front floor panel), of the ridge portions in the tunnel portion, a reinforcing member is preferably positioned on a ridge portion on the side closer to the dashboard lower panel (the front side), which is the portion where an impact load is first applied at the time of a front end collision. In this manner, it is not only possible to increase the bending stiffness and the torsional stiffness of the front floor panel but it is also possible to increase its impact absorbing properties.

A formed member according to the present invention has a reinforcing member welded to a ridge portion of the formed member. Therefore, at the time of axial crushing, for example, (i) deformation tending to open the outer wall portion of the formed member towards the outer side of the cross section (referred to below as outward deformation) is suppressed by the reinforcing member with certainty, thereby increasing the buckling load of the formed member, and (ii) if the formed member has a reinforcing member welded to the ridge portion having the greatest effect on properties, it is possible to increase the single buckling load and diminish the buckling wavelength of the formed member. As a result, the present invention improves the ability of the formed member to absorb impact energy.

In addition, with a formed member according to the present invention, due to the provision of a reinforcing member welded to a ridge portion of the formed member, at the time of three-point bending, for example, the reinforced ridge portion has a higher stiffness and a higher strength compared to a conventional case in which a reinforcing member is not joined to a ridge portion. Therefore, the formed member according to the present invention exhibits a high bending strength from the initial stage of deformation, and the amount of deformation of the ridge portion is smaller than for a conventional formed member. As a result, a side wall portion can effectively bear a load which produces a bending stress, and a high buckling load when bending is applied is obtained. Therefore, the present invention improves the ability of a formed member to absorb impact energy.

Furthermore, due to the provision of a reinforcing member welded to a ridge portion in a formed member according to the present invention, when the formed member is applied to a floor panel, for example, the resistance of the floor panel to bending deformation and torsional deformation is increased, and the bending stiffness and the torsional stiffness of the formed member can be increased.

Therefore, by fabricating a component for an automobile using a formed member according to the present invention, any of the following is possible (A) increasing the ability to absorb impact energy at the time of axial crushing when the formed member is a tubular component for an automobile which bears an impact load applied in the axial direction (such as a front side member, a front crash box, a front upper rail, a floor cross member, a rear side member, or a rear crash box), (B) increasing the ability to absorb impact energy at the time of three-point bending when the formed member is a tubular component for an automobile which bears an impact load applied in a direction perpendicular to the axial direction (such as a bumper reinforcement, a side sill, a center pillar, or a roof rail side), and (C) increasing the bending stiffness and torsional stiffness when the formed member is a flat component for an automobile (such as a floor panel).

FIGS. 7(a)-7(d) are explanatory views schematically showing suitable positions for forming welds 40-42 in a portion of a cross section of formed members 44-47.

FIG. 7(a) shows a formed member 44 which bears an impact load applied in its axial direction. A weld 40-42 is preferably located at least in a region which is included in 50% of the circumferential length $R\theta$ of the cross section of a ridge portion (shown as $\frac{1}{2}R\theta$ in the figure).

FIG. 7(b) shows a formed member 45 which bears an impact load applied in a direction perpendicular to the axial direction (this load σ is indicated by a hollow arrow in the figure). A portion of a weld 40-42 is preferably located at the end of the ridge position where a ridge portion is connected to a side wall.

FIG. 7(c) shows a formed member 46 in which a single weld bears impact loads applied in two directions, i.e., in the axial direction and in a direction perpendicular to the axial direction.

FIG. 7(d) shows a formed member 47 which has a plurality of welds which individually correspond to different load directions in the same cross section.

Figure 8:
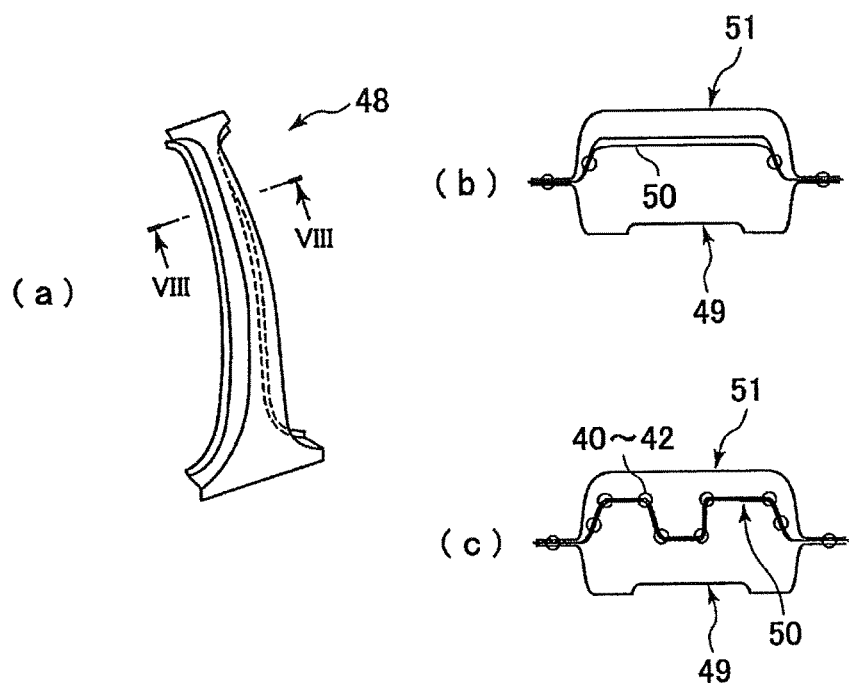

FIG. 8 gives explanatory views showing an example of an embodiment in which the present invention is applied to a center pillar (a B-pillar) 48. FIG. 8(a) is an overall view, FIG. 8(b) is a cross-sectional view of a conventional center pillar for comparison taken along line XIII-XIII of FIG. 8(a), and FIG. 8(c) is a cross-sectional view of an example of a center pillar according to the present invention, also taken along line VIII-VIII of FIG. 8(a). In the figures, the locations of welds are shown by circles. The same applies to FIG. 9.

When the present invention is applied to a B-pillar 48, a B-pillar reinforcement 50 which is provided between a B-pillar outer member 49 and a B-pillar inner member 51 is constituted by a formed member according to the present invention. The B-pillar reinforcement 50, which is a formed member having a reinforcing member, is usually disposed in the upper portion of the B-pillar 48. By applying the present invention to a B-pillar reinforcement 50 and providing reinforcing members (not shown) and welds 40-42 on its ridge portions, the resistance to impacts of the B-pillar outer member 49 is greatly improved. The exact structure of the B-pillar reinforcement 50 which is the formed member in FIG. 8(c) can be any of the specific shapes shown in FIG. 2, for example.

There are no particular limitations on the materials of the B-pillar reinforcement 50 and the reinforcing member, and they may be high tensile strength steel sheets or hot press-formed materials.

The welds shown in FIG. 8(c) are spot welds 40, but they need not be spot welds 40 and may be laser welds 41 or seam welds 42.

More preferably, the performance of the B-pillar 48 with respect to bending load can be further increased by forming a plurality of ridge portions in the B-pillar outer member 49 and the B-pillar inner member 51 and suitably disposing reinforcing members and welds 40-42 on these ridge portions.

Figure 9:
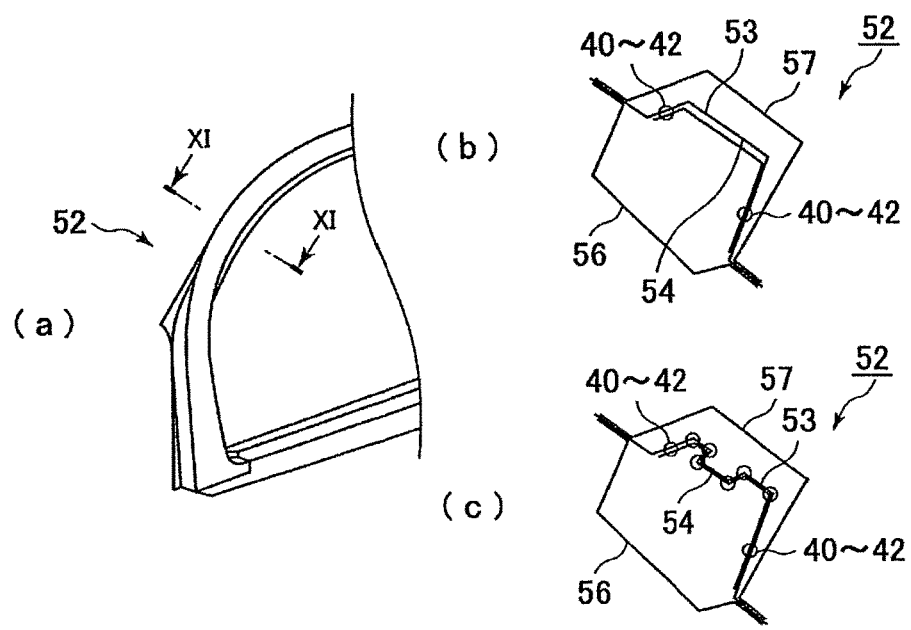

FIG. 9 gives explanatory views showing an example of an embodiment in which the present invention is applied to a front pillar (an A-pillar). FIG. 9(a) is an overall view, FIG. 9(b) is a cross-sectional view of a conventional front pillar for comparison taken along line XI-XI of FIG. 9(a), and FIG. 9(c) is a cross-sectional view of an example of a front pillar according to the present invention, also taken along line XI-XI of FIG. 9(a).

An A-pillar inner reinforcement 54 and an A-pillar outer reinforcement 53 are provided between an A-pillar outer member 57 and an A-pillar inner member 56 of an A-pillar 52. When the present invention is applied to an A-pillar 52, a reinforcing member is preferably disposed on a ridge portion of the outer reinforcement 53 and secured by a weld 40-42 provided on the ridge portion. Namely, the outer reinforcement 53 is constituted by a formed member according to the present invention.

Alternatively, a reinforcing member and a weld 40-42 may be disposed on a ridge portion of the inner reinforcement 54 of the A-pillar.

As a result, the crushing load by bending of the A-pillar 52 at the time of a front-end collision can be greatly increased.

In FIGS. 8 and 9, in order to simplify the explanation, reinforcing members are not shown, but in an actual embodiment, the various types shown in FIG. 2, for example, can be employed in accordance with the shape of the inner reinforcement 54 and the outer reinforcement 53, namely, in accordance with the shape of the formed member.

There is no particular limitation on the material used for the outer reinforcement 53 and the inner reinforcement 54 of the A-pillar or the reinforcing members provided on their ridge portions, and they may be high tensile strength steel sheets or hot press-formed materials.

A manufacturing method according to the present invention will be explained.

According to one embodiment, a formed member according to the present invention is manufactured by providing a formed member body portion and a reinforcing member each having a ridge portion, which is formed by bending by previously carrying out press forming or roll forming. The press forming or roll forming which is previously carried out may be performed in a hot state or a cold state. On the ridge portion of the formed member body portion which has previously been formed, a reinforcing member which has previously bent to the same shape is disposed and is welded in the ridge portion to secure the two members to each other. When the reinforcing member is disposed on the ridge portion of the body portion, gaps between the two members are made as small as possible. The location of welds at this time is as already described in detail. A welding means can be suitably selected from the above-described various means.

In this manner, according to the present invention, a formed member can be manufactured by simple means. If a reinforcing member is provided on a ridge portion, the impact resistance of the ridge portion can be greatly improved locally just by locally providing the reinforcing member in a desired location, and if such a formed member is used as a component for an automobile, it is possible to simultaneously decrease the vehicle weight and improve impact resistance, which are by nature mutually conflicting properties.

According to another embodiment of the present invention, a formed member according to the present invention is manufactured by superposing a flat sheet blank and a flat sheet reinforcing member 35, 35-1, or 35-2. The superposing position becomes the location at which a ridge portion is to be formed on the blank.

The blank and the reinforcing member 35, 35-1, or 35-2 are welded at this location by any of the above-described welding methods to provide a flat welded member. The location of the welds and the method of forming the welds at this time are as described above.

Press forming or roll forming is carried out on this flat welded member such that a ridge portion 28, 30, or 33 is formed in the region where the reinforcing member 35, 35-1, or 35-2 is present. In this manner, a formed member according to the present invention having a reinforcing member on the press-formed or roll-formed portion, namely, on the ridge portion is manufactured. Forming at this time can be carried out in either a cold state or a hot state. It can be suitably determined whether to use hot or cold forming in accordance with the type of material and the welding means.

The present inventors carried out a large number of times a press forming test in which superposed two high-strength steel sheets (sheet thickness of 0.7-2.0 mm) of the grade of 440-980 MPa were welded by spot welding and then subjected to 90-degree bending in such a manner that the center of the spot welds which were formed became the apex of a ridge portion having a bending radius of 3 mm, and they ascertained whether the spot welds fractured as a result of the bending. It was confirmed that there was no occurrence of weld cracking in any of these tests.

In the present invention, a sufficient effect is obtained even when press forming (or roll forming) is carried out after a flat welded material is heated to a temperature of at least the $Ac_3$ point, namely, even when the press forming is so-called hot press forming. As a result, a hot press-formed member having a higher strength can be manufactured while increasing press formability.

When a hot press-formed member is made from a high strength material, so-called HAZ softening sometimes occurs in the welds. However, by performing hot press forming on a flat welded material, quench hardening takes place even in the portions which were softened at the time of welding. As a result, HAZ softened portions no longer exist, and a formed member in which the base metal and the welds have the same strength (hardness) is obtained.

There are no particular limitations on the material of a steel sheet used in the present invention as long as it can be heated to at least the $Ac_3$ point and undergo hot press forming or hot roll forming. However, HAZ softening of welds is due to martensite strengthening of steel, which greatly contributes to the strengthening mechanism of steel. Therefore, a steel type having a strength of at least 590 MPa which produces HAZ softening (particularly a dual-phase (DP) steel) is preferred, and a steel having a strength of at least 1500 MPa is more preferred.

In this manner, according to the present invention, it is possible to provide a formed member suitable for use in a component for an automobile or as a component for an automobile itself which can be inexpensively manufactured and has excellent dimensional accuracy, which has excellent axial crushing properties and three-point bending properties, or which has excellent bending stiffness and torsional stiffness.

EXAMPLE 1

FIG. 10(a) is an explanatory view schematically showing the cross-sectional shape of a reinforcing member 35 used in this example, and FIG. 10(b) is an explanatory view showing the shape and location of reinforcing members 35 on the ridge portions 28 of a formed member 21.

FIG. 11(a) is a perspective view of a formed member 21 after spot welding of reinforcing members, and FIGS. 11(b) and 11(c) are explanatory views showing the location of spot welding of reinforcing members to a ridge portion 28 in an example of the present invention and Comparative Example 2, respectively In Comparative Example 2, no spot welds were present on the ridge portion 28.

The formed members 21 used in this example had nearly the same cross-sectional shape as the formed member 21 shown in FIG. 1(a), so the same portions are indicated by the same referential numbers. In FIGS. 11(b) and 11(c), spot welds are shown by solid circles. The formed member 21 and the reinforcing members 35 both had a sheet thickness of 0.7 mm.

Figure 13:
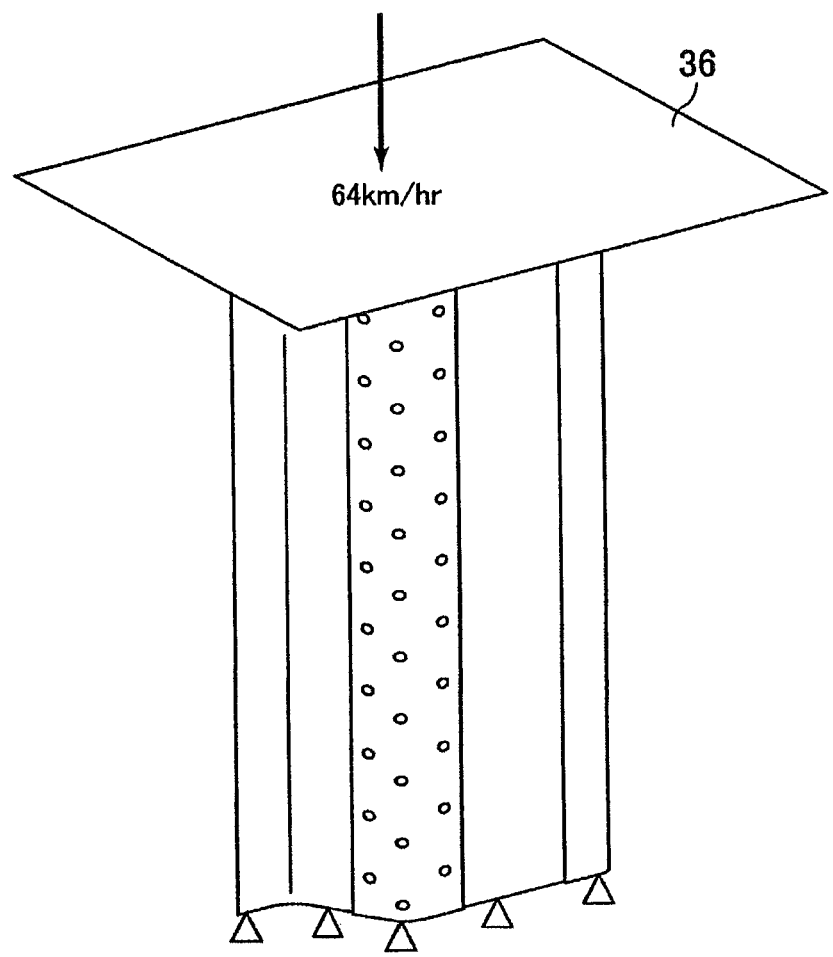
FIG. 13 is an explanatory view showing a test method.

FIG. 12 is an explanatory view showing the specification of the formed members and the test conditions. FIG. 13 is an explanatory view showing the test method. In FIG. 12, the locations shown by the hollow arrows in the column labeled "Cross-sectional view of formed member" are the locations of spot welds.

The test shown in FIG. 13 was carried out on the formed members obtained in Comparative Examples 1 and 2 and Examples 1 and 2 shown in FIG. 12. Namely, as shown in FIG. 13, a drop-weight body 36 which was dropped at a speed of 64 km/hour was allowed to impinge on the upper end of a vertically disposed formed member sample having its lower end totally secured and restrained, and the load at which the amount of deformation in the axial direction became 20 mm was measured. As shown in FIG. 12, spot welds were not present on the ridge portions 28 of Comparative Examples 1 and 2, but spot welds were present on the ridge portions 28 of Examples 1 and 2 according to the present invention.

FIG. 14(a) is a graph showing the relationship between the displacement and the load for formed members made from a steel sheet having a tensile strength of 270 MPa (Comparative Example 1 and Example 1 of the present invention), and FIG. 14(b) is a graph showing the relationship between the displacement and the absorbed energy for formed members made from a steel sheet having a tensile strength of 270 MPa (Comparative Example 1 and Example 1 of the present invention).

Similarly, FIG. 15(a) is a graph showing the relationship between the displacement and the load for formed members when the tensile strength was 980 MPa (Comparative Example 2 and Example 2 of the present invention), and FIG. 15(b) is a graph showing the relationship between the displacement and the absorbed energy for specimens having a tensile strength of 980 MPa (Comparative Example 2 and Example 2 of the present invention).

As is clear from the graphs in FIGS. 14(a), 14(b), 15(a), and 15(b), Examples 1 and 2 according to the present invention had higher load properties and greater ability to absorb impact energy than Comparative Examples 1 and 2.

Figure 16:
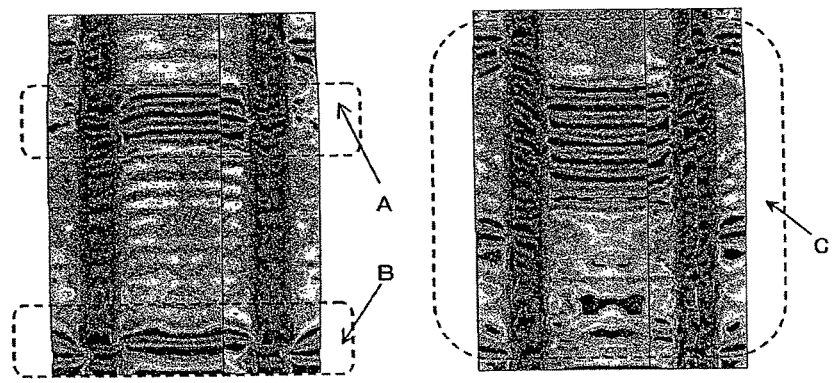
FIGS. 16(a) and 16(b) are explanatory views showing the distribution of stress in the axial direction of a member when the amount of deformation of Example 2 and Comparative Example 2, respectively, of a formed member was 8 mm.

FIGS. 16(a) and 16(b) are explanatory views showing the distribution of stresses in the axial direction of formed members which had a deformation of 8 mm and were made of a material having a tensile strength of 980 MPa (Comparative Example 2 and Example 2 of the present invention, respectively). The reinforcing members 35 have been omitted from FIG. 16.

As shown in FIG. 16(a), in the case of Comparative Example 2, stress concentrations developed in portions A and B in the axial direction, whereas in the case of Example 2 of the present invention shown in FIG. 16(b), outward deformation of the ridge portion was more restrained than in Comparative Example 2. As a result, stresses in the axial direction increased, and the stress distribution uniformly spread over the entirety of region C in the axial direction.

EXAMPLE 2

A hat body portion having a hat-shaped cross section, namely, a hat-shaped to formed member was manufactured by hot press forming and was tested by a three-point bending test. This example illustrates an embodiment in which a reinforcing member 60 was provided on the inner side of ridge portions of the hat-shaped formed member.

Figure 17:
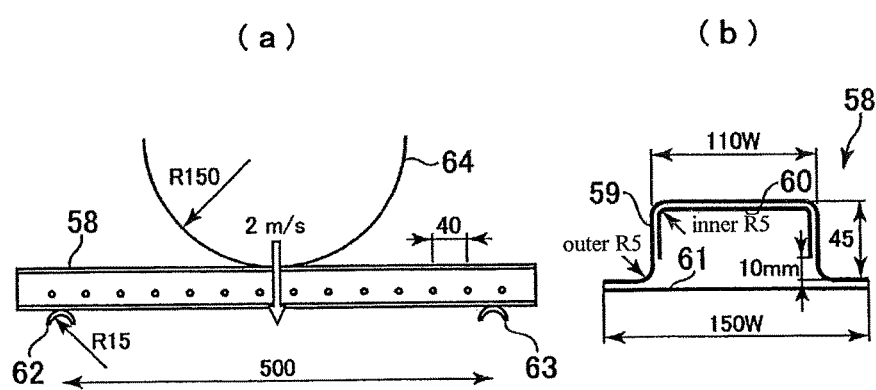
FIG. 17(a) is an explanatory view showing the state during a three-point bending test.
FIG. 17(b) is an explanatory view showing the cross-sectional shape of a hat-shaped member.

FIG. 17(a) is an explanatory view showing the state during the three-point bending test, and FIG. 17(b) is an explanatory view showing the cross-sectional shape of the hat-shaped formed member 58.

As shown in FIG. 17(b), the hat-shaped formed member 58 comprises a hat body portion 59, a reinforcing member 60, and a hat bottom plate 61. The specifications of these components 59-61 are given below.

Hat body portion 59: a galvannealed steel sheet for hot press forming having a sheet thickness of 1.2 mm, a width of 240 mm, and a length of 600 mm Reinforcing member 60: a galvannealed steel sheet for hot press forming having a sheet thickness of 1.4 mm, a width of 180 mm, and length of 600 mm Hat bottom plate 61: a galvannealed steel sheet of 780 MPa grade having a sheet thickness of 1.8 mm, a width of 150 mm, and length of 600 mm The flat sheets (blanks) for the hat body portion 59 and the reinforcing member 60 were welded by the welding methods shown in below-described FIG. 19 to obtain a welded blank for hot press forming. The welded blank was subjected to hot press forming (heating at 900° C. for 4 minutes) to form a hat body member, and then the hat bottom plate 61 was spot welded to the hat body member to manufacture a hat-shaped formed member 8 for a bending test.

As shown in FIG. 17(a), the hat-shaped formed member 58 which was obtained in this manner was supported at two points 62 and 63 separated by 500 mm, and an impactor 64 having a radius of 150 mm was lowered at a speed of 2 mm/second to impact the center in the lengthwise direction of the hat-shaped formed member 58 to produce bending deformation.

Figure 18:
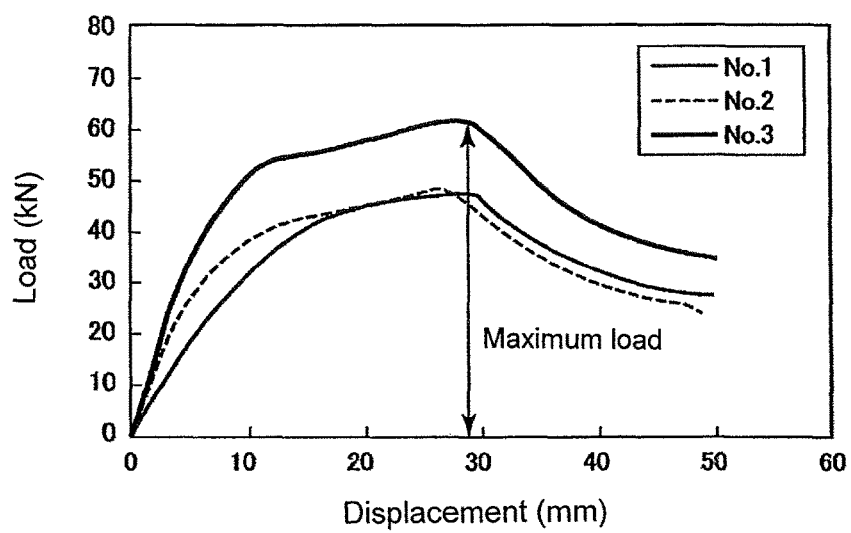
FIG. 18 is a graph showing the results of a bending test for Nos. 1-3.
Figure 20:
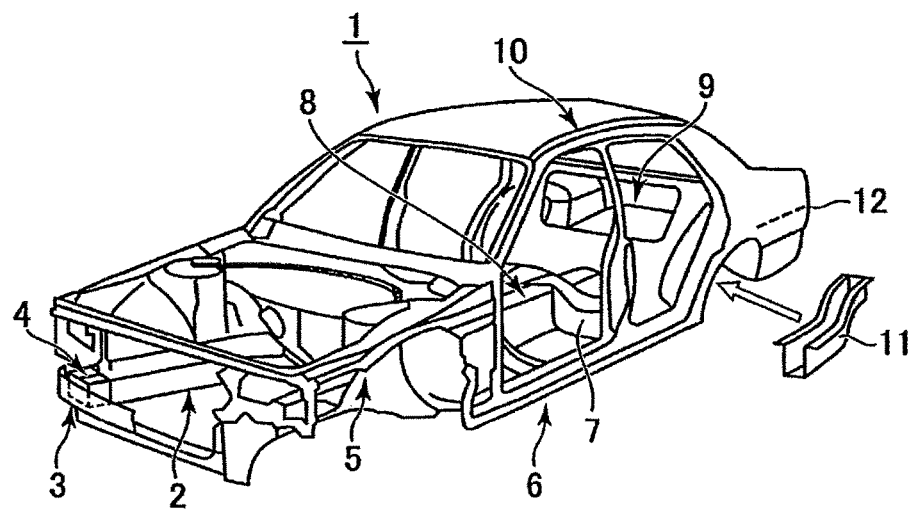
FIG. 20 is an explanatory view schematically showing an automobile body.
Figure 21:
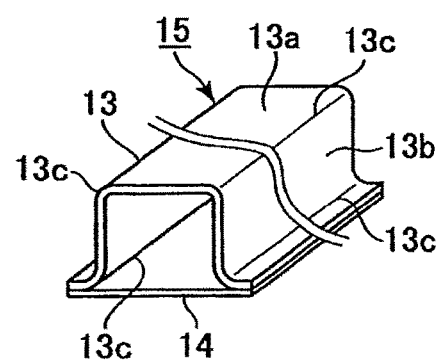
FIG. 21 is an explanatory view schematically showing the structure of a front side member which is one example of a component of an automobile which is formed by assembling a formed member and a flat closing plate.

FIG. 18 is a graph showing the result of bending tests for Nos. 1-3, and FIG. 19 is an explanatory view compiling the test conditions and the test results (maximum load) for Nos. 1-6.

In FIG. 19, HP forming means hot press forming, and TWB means tailor welded blank. The circles in the column labeled "Shape in batch TWB" and in the column labeled "Cross-sectional shape" indicate the location of spot welds, and the straight lines in the column labeled "Shape in batch TWB" indicate continuous welds (seam welds or laser welds).

Nos. 1 and 2 in FIGS. 18 and 19 are comparative examples not having welds on the ridge portions, and Nos. 3-6 are examples of the present invention having welds on the ridge portions.

Spot welding was carried out with a pitch of 40 mm in the extending direction of the ridge line. The seam welds for No. 5 (perpendicular to the ridge lines) had a length of 40 mm and a pitch of 40 mm. The curved laser welds for No. 6 had sine wave curves with an amplitude of 20 mm and a period of 40 mm.

From the results shown in FIGS. 18 and 19, it can be seen that the examples of the present invention had a greatly increased maximum load compared to the comparative examples, and in particular, the load was increased compared to the comparative examples for the entire range of displacement indicating that the amount of absorbed impact energy was greatly increased.

The invention claimed is:

1. A formed member having at least one bent ridge portion connecting one surface and another surface characterized by having a reinforcing member which is joined to at least the bent ridge portion of the formed member by multiple welds provided on the bent ridge portion, wherein the reinforcing member has a widthwise dimension which can cover at least the entirety of the bent ridge portion in a cross section perpendicular to an extending direction of the bent ridge portion, wherein the multiple welds joining the reinforcing member to at least the bent ridge portion comprising three or more welds, the three or more welds being provided intermittently along the extending direction of the bent ridge portion and on the bent ridge portion that consists only of a curved surface and that is generated on a projecting direction side of the formed member when a flat sheet blank having the reinforcing member welded thereto is pressed formed or roll formed, and each of the welds is a spot weld, wherein a hardness of a base metal of the formed member is uniform with a hardness of a heat-affected zone of the formed member.

2. A formed member as set forth in claim 1 wherein the welds are located at least in a region from a center in a circumferential direction of a cross section of the bent ridge portion that consists only of the curved surface to a position at a 50% of a circumferential length of the cross section of the bent ridge portion.

3. A formed member as set forth in claim 1 wherein the reinforcing member extends over all or a portion of the extending direction of the bent ridge portion.

4. A formed member as set forth in claim 1 wherein a single reinforcing member or two or more reinforcing members are provided in the extending direction of the bent ridge portion.

5. A formed member as set forth in claim 1 wherein the reinforcing member is provided on the outer peripheral surface or the inner peripheral surface of the bent ridge portion.

6. A method of manufacturing a formed member comprising spot welding a flat sheet reinforcing member to a flat sheet blank by forming multiple spot welds in a location which becomes a ridge portion of the blank that consists only of a curved surface that is generated on a projecting direction side of the formed member, which is formed as a result of the flat sheet being press formed or roll formed, and carrying out press forming or roll forming on the blank having the reinforcing member spot welded thereto to manufacture a formed member having at least one bent ridge portion connecting one surface and another surface wherein the formed member has a reinforcing member joined to at least the bent ridge portion of the formed member by the spot welds provided on the bent ridge portion, the reinforcing member having a widthwise dimension which can cover at least an entirety of the bent ridge portion in a cross section perpendicular to an extending direction of the bent ridge portion, the multiple spot welds spot welding the flat sheet reinforcing member to the flat sheet blank comprising three or more spot welds, the three or more spot welds being provided along the extending direction of the bent ridge portion and on the bent ridge portion, and a hardness of a base metal of the formed member being uniform with a hardness of a heat-affected zone of the formed member.

7. A method of manufacturing a formed member as set forth in claim 6 wherein the flat sheet blank is made of a material having an $Ac_3$ point and the press forming is carried out after the flat sheet blank having the flat sheet reinforcing member spot welded thereto is heated to a temperature of at least the $Ac_3$ point.

* * * * *